Nov. 7, 1939.  E. WEBER  2,179,364
POWER CONTROL SYSTEM
Original Filed Feb. 5, 1938  2 Sheets-Sheet 1
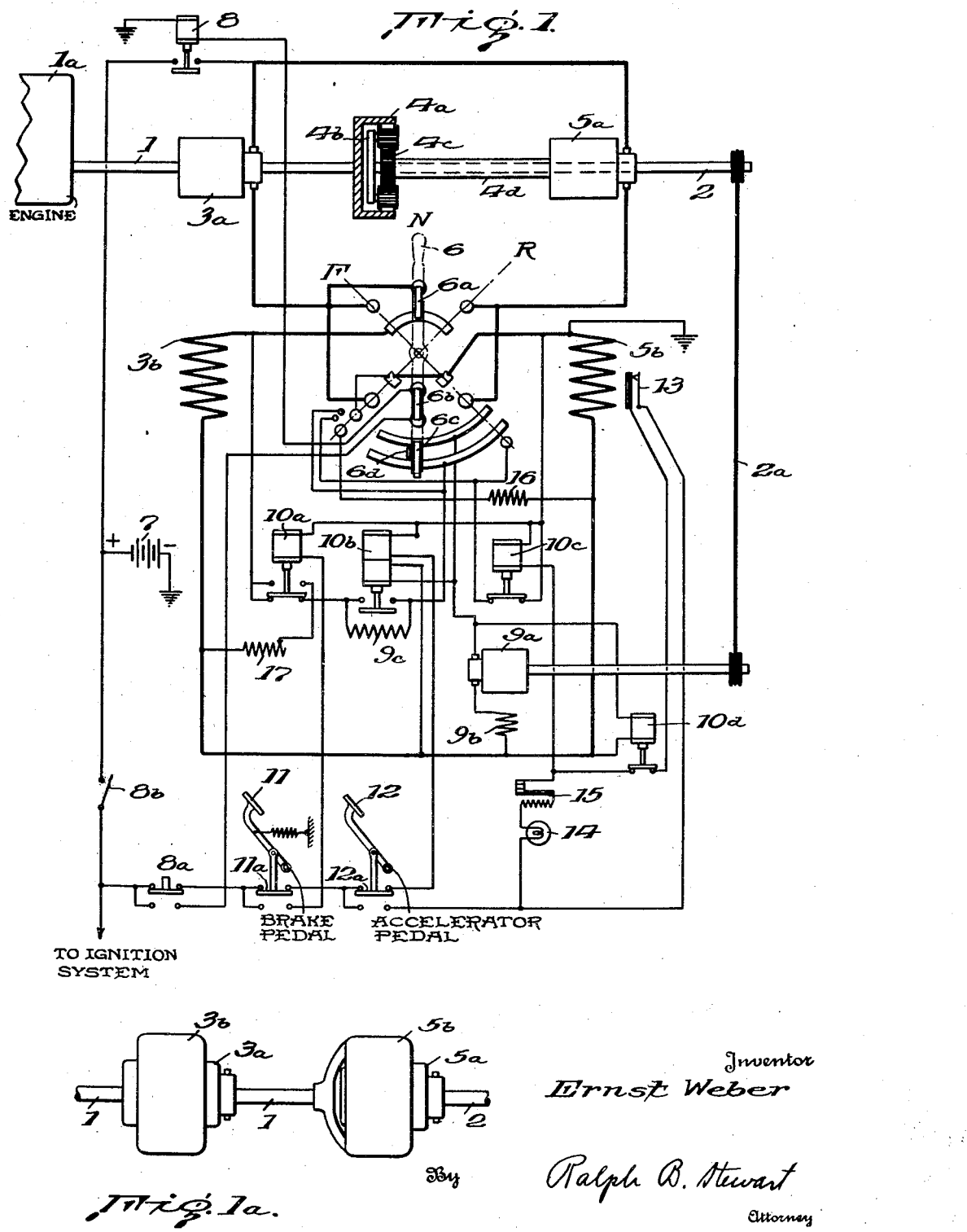
Inventor
Ernst Weber
By Ralph B. Stewart
Attorney Nov. 7, 1939.   E. WEBER   2,179,364
POWER CONTROL SYSTEM
Original Filed Feb. 5, 1938   2 Sheets-Sheet 2

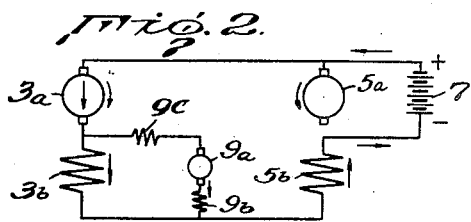

Fig. 2.
ENGINE STARTING

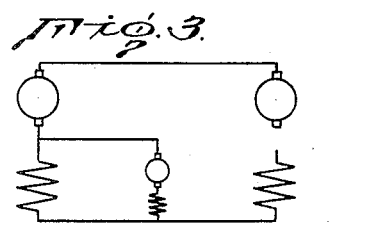

Fig. 3.
NEUTRAL
CAR AT REST
ACCELERATOR RELEASED

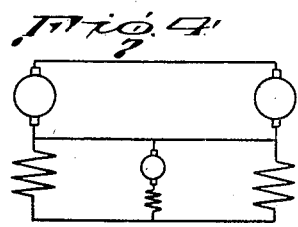

Fig. 4.
FORWARD
CAR AT REST
ACCELERATION RELEASED

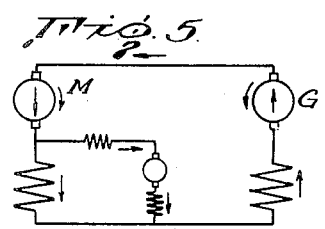

Fig. 5.
FORWARD
ACCELERATOR DEPRESSED
CAR AT REST OR RUNNING
AT LOW SPEED

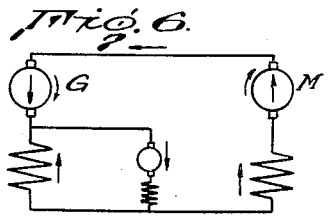

Fig. 6.
FORWARD
ACCELERATOR DEPRESSED
CAR AT HIGH SPEED

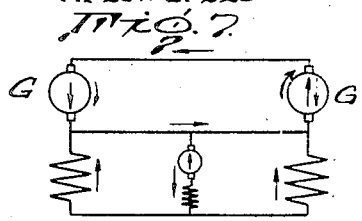

Fig. 7.
FORWARD RUNNING (HIGH SPEED)
ACCELERATOR RELEASED
ENGINE BRAKING

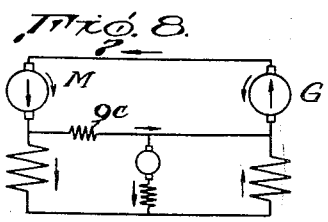

Fig. 8.
FORWARD; LOW SPEED
ACCELERATOR RELEASED
ENGINE BRAKING

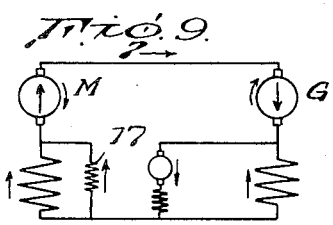

Fig. 9.
FORWARD
BRAKE PEDAL DEPRESSED

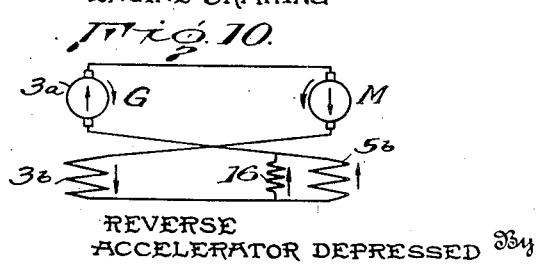

Fig. 10.
REVERSE
ACCELERATOR DEPRESSED

Inventor
Ernst Weber,
By Ralph B. Stewart
Attorney

Patented Nov. 7, 1939

2,179,364

UNITED STATES PATENT OFFICE 2,179,364

POWER CONTROL SYSTEM

Ernst Weber, Mount Vernon, N. Y., assignor to The Power Transmission Company, Incorporated, a corporation of Delaware Application February 5, 1938, Serial No. 189,014
Renewed January 12, 1939

30 Claims. (Cl. 290—17)

This invention relates to a power transmission system particularly adapted for use in driving a variable speed and variable torque load from an internal combustion engine.

My present invention relates to improvements for controlling a power transmission system of the general type disclosed in U. S. Patent No. 2,000,786 granted May 7, 1935.

An object of the present invention is to simplify the main controller arrangement for connecting the two dynamo machines for operation of the vehicle in forward and reverse directions.

The system of my invention involves control means responsive to the speed of the load for automatically varying the speed-torque relation between the drive shaft and the load shaft. A further object of the invention is to devise a control arrangement for securing increased driving torque in the initial stages of acceleration and to provide means operative at a predetermined load speed to change the standard of operation of the speed-responsive control device.

A further object is to provide means responsive to the temperature of the electric power units for disabling the transmission system in the event of excessive rise in temperature.

Still another object is to devise means for automatically slowing down the vehicle when the vehicle speed becomes excessive.

Another object is to devise a control arrangement involving a signal device which becomes operative either upon excessive speeding of the vehicle or upon excessive temperature rise in the power units of the transmission system.

Still another object is to provide time delay means rendered operative upon the energization of said signal means for automatically disabling the transmission system in case the signal remains energized for a predetermined time.

My invention involves a control switch operable by the engine accelerator pedal when in depressed position for effecting the flow of power between the engine and the load. A further object is to provide a switch operated by the mechanical brake pedal for disabling the circuit controlled by said accelerator switch when the mechanical brakes are operated.

Still another object is to utilize one of the dynamo electric machines for starting the engine, and to provide a starting switch for controlling said machine and for disabling the circuits controlled by the accelerator switch and the brake pedal switch while the engine is being started.

A further object is to utilize the current established during engine starting for establishing residual magnetism in the proper direction in both power dynamos as well as in the regulator generator.

A preferred embodiment of my invention is illustrated in the accompanying drawings in which:

Figure 1 shows a schematic circuit diagram of my control system applied to two dynamo electric machines coupled to a drive shaft and a driven shaft through a differential gearing;

Figure 1a shows an alternative arrangement for associating the two dynamo electric machines with the drive shaft and the load shaft, and Figures 2 to 10 inclusive are circuit diagrams illustrating the connections for various stages of operation of the transmission system.

Referring to the drawings, the drive shaft 1 is driven from any suitable source of power such as an internal combustion engine represented at 1a, and the driven shaft 2 is arranged to drive any suitable load, such as the traction wheels on an automotive vehicle. While my invention is particularly adapted for use in connection with the driving of automotive vehicles by internal combustion engines, it is not limited to such use, and may be employed generally for accelerating and driving loads of various types.

The armature 3a of a power dynamo is driven directly from the drive shaft 1, and the drive shaft is also connected to drive the ring gear 4a of a differential gearing. The load shaft 2 is driven from the planet spider 4b of the differential gearing while armature 5a of a second power dynamo is driven from the sun gear 4c of the differential gearing, preferably by means of a tubular shaft 4d telescoping the load shaft 2. For convenience, the power dynamo connected to the shaft 1 may be termed the booster dynamo, and the dynamo driven from the differential gearing may be termed the reducer dynamo. These two dynamos are provided with series field windings 3b and 5b, respectively, which are arranged to be connected in serial circuit relation with armatures 3a and 5a by means of a circuit controller having a movable operating element indicated in dotted lines at 6 and carrying movable contacts 6a and 6b cooperating with fixed contacts for connecting the two field windings in series with the armatures in one direction (in the position F) for forward operation of the load shaft, and for connecting the field windings in series with the armatures in the opposite direction (in the position R) for operation of the load shaft in reverse direction. In the neutral position N of the controller, movable contact 6a cooperates with a fixed contact to connect the field winding 3b in series with the armature 3a in a circuit including a battery 7 which serves as a source of current for operating the booster dynamo as a motor to drive the engine in starting. The starting circuit is controlled by a magnetic switch or relay 8, the energizing circuit of which includes movable contact 6b of the controller when in neutral position and the relay circuit is controlled by a push-button switch 8a which is preferably mounted upon the dashboard of the vehicle. The circuit to relay 8 also includes a switch 8b which preferably assumes the form of a lock-switch mounted on the dashboard of the vehicle and is arranged to control the circuit to the ignition system and to other control relays. The engine is started by placing the controller 6 in the neutral position N, closing the switch 8b and pressing the starting button 8a. As soon as the engine has started, the button 8a is released.

The armature 9a of a regulator generator is driven from the load shaft 2 by any suitable means such as belt drive 2a. The regulator generator is provided with a series field winding 9b, and the regulator is normally connected in shunt to the field winding 3b of the booster dynamo by contact 6c on the controller, through resistance 9c, and through the bottom contacts on relay 10a. A relay 10b, having two operating windings, is arranged to short-circuit resistance 9c when either operating winding is energized to a predetermined degree. The energizing circuit for the upper winding on relay 10b is completed from battery 7 through switch 8b, through the upper contacts on starting button 8a, through the upper contacts on switch 11a which is operated from the brake pedal 11 which also controls the mechanical brakes of the vehicle, and through the upper contacts of switch 12a, which is operated from the pedal 12 which also controls the accelerator of the engine. It will be understood that switch 8a is normally biased to its upper position, and switches 11a and 12a are held in their upper positions when pedals 11 and 12 are in released positions. Closing of the switch 8b will normally energize the relay 10b and short-circuit resistance 9c, but operation of any of switches 8a, 11a and 12a from the positions shown will de-energize relay 10b and remove the short-circuit. The energizing circuit for the lower winding of relay 10b is connected directly in shunt to the regulator generator, and this winding is designed to operate the relay at a predetermined, relatively low voltage.

Relay 10a is energized from battery 7 through a circuit including switch 8b, the upper contacts of switch 8a and the lower contacts of switch 11a. With switch 8b closed and switch 8a in released position, depression of the brake pedal 11 energizes relay 10a and thereby opens the circuit from the regulator generator to the field winding 3b, and the upper contacts of relay 10a close a circuit connecting an adjustable resistance 11 in shunt to the booster field winding 3b. Preferably, switch 11a is closed by the initial movement of pedal 11 and before the pedal moves far enough to apply the mechanical brakes.

In the forward position of the controller 6, the contact 6c completes a circuit for connecting the regulator generator 9a—9b in shunt to the reducer field coil 5b, the circuit including the normally closed contacts of relay 10c.

In the reverse position of controller 6, a movable contact 6d carried by the controller arm, but insulated from contact 6c, cooperates with stationary contacts on the controller to connect the right-hand contact on relay 10b to the left-hand contact on relay 10c, and thereby provide a path including the lower contacts on relay 10a, the contacts on relay 10b and the contacts on relay 10c for normally short-circuiting the armatures of the two power dynamos upon each other and also short-circuiting the field windings of the two power dynamos upon each other. The stationary contacts associated with movable contact 6c on the controller complete the circuit from the regulator generator in the neutral and forward positions of the controller, but interrupt the circuit of the regulator generator in the reverse position of the controller.

Relay 10c is energized from battery 7 through a circuit including switch 8b, the upper contacts of switches 8a and 11a, the lower contacts of accelerator switch 12a, through the normally closed contacts of a thermal switch 13 located in the field structure of the reducer dynamo and through the normally closed contacts of relay 10d. A second energizing path for relay 10c is connected in shunt to the thermal switch 13 and the contacts of relay 10d and includes a signal lamp 14 and a normally closed time delay switch 15. Relay 10d is energized by a circuit connected directly in shunt to the generator regulator 9a—9b, and is designed to operate at a predetermined voltage.

Operation of my control system is as follows:

Engine starting

As previously explained, the engine is started by closing the switch 8b and by depressing the push button 8a which energizes relay 8 and connects battery 7 in circuit with the booster dynamo and operates this dynamo as a motor to drive the engine. The main circuit connections for starting the engine are shown in Figure 2 of the drawings. It will be seen that current from battery 7 not only flows through field winding 3b but also flows through field winding 5b and establishes residual magnetism in the pole pieces of the reducer dynamo in proper direction for subsequent operation. The armature 5a of the reducer dynamo is disconnected during engine starting.

The circuit of relay 8 cannot be completed unless the controller 6 is in neutral position. This prevents the starting of the engine when the transmission is connected for forward or reverse operation.

After the engine has been started, push button 8a is released and the upper winding of relay 10b becomes energized from the battery 7 and short-circuits resistance 9c. The main circuit connections for the condition when the car is at rest with the controller in neutral, is shown in Figure 3, where it will be seen that the reducer armature remains disconnected, and the regulator generator is connected in shunt to field winding 3b. With the controller in a neutral position, the engine may be warmed up by operation of the accelerator pedal 12 without applying power to the load shaft.

Forward driving

When it is desired to drive the vehicle in the forward direction, the controller 6 is moved to the position F, and in this position the main circuit connections are illustrated in Figure 4 of the drawings. The reducer armature 5a is connected to the field winding 5b and regulator 9a—9b is connected in shunt to field winding 5b, but otherwise the circuit connections remain as shown in Figure 3. The reducer armature 5a is rotating in a direction opposite to the direction of engine rotation, and the field winding 5b is connected in series with the armature 5a in proper direction for operation as a series generator, but it will not pick-up since field 5b is shunted by the regulator generator and the armatures of the two power dynamos are short-circuited upon each other and cannot send current through their field windings. The connection between the booster armature 3a and the field 3b is in a direction to produce motoring operation by the booster in the direction of engine rotation when the exciting current is supplied from the reducer dynamo.

Upon depressing the accelerator pedal 12, switch 12a de-energizes relay 10b and thereby removes the short-circuit from resistance 9c, and also energizes relay 10c and thereby disconnects the regulator generator from the reducer field 5b. The circuit arrangement under this condition is illustrated in Figure 5 of the drawings. The reducer dynamo picks-up and establishes current flow in the circuit in the direction indicated by the arrows in Figure 5.

As current is established in the transmission circuit by the reducer dynamo, the reaction from the reducer dynamo on the differential gearing applies driving torque to the load shaft, and the vehicle begins to accelerate. The torque exerted by the booster dynamo on the drive shaft is added to the engine torque in driving the ring gear of the differential gearing. The booster field 3b is shunted by a path including the regulator armature and field 9a and 9b and the resistance 9c connected in series. This path shunts a certain amount of current around the field coil 3b, and the amount of current flowing in the shunt path may be adjusted by adjusting the value of resistance 9c.

As the car begins to accelerate, a voltage is generated in the regulator armature 9a in proper direction for increasing the shunting effect of the regulator generator. When the car reaches a predetermined speed, for example, a speed of ten miles per hour, the voltage supplied by the regulator to the lower winding of relay 10b is sufficient to operate the relay and short-circuit resistance 9c, thereby connecting the regulator directly in shunt to booster field 3b. Continued increase in the car speed increases the voltage generated by the regulator and thereby shunts more current around the booster field 3b, and when the voltage generated by the regulator equals the internal voltage drop in the shunt circuit the current in the field 3b becomes zero. Further increase in vehicle speed causes current to flow through booster field 3b from regulator 9a—9b in the opposite direction as shown in Figure 6 of the drawings, and the booster dynamo then begins operation as a generator and sustains the flow of current in the transmission circuit in the same direction as the reducer dynamo. Simultaneously with the acceleration of the car, the reducer dynamo armature slows down in its speed of rotation and comes to a standstill subsequent to the time when the booster begins to act as a generator, and then reverses its direction of rotation and adds its speed to the engine speed for driving the load shaft, the reducer being driven as a motor from the booster dynamo. This condition of operation is illustrated in Figure 6.

The operation of the transmission system is in general the same as the operation of the system disclosed in U. S. Patent No. 2,000,786, in that, during the initial stage of acceleration, the reducer dynamo acts as a generator and drives the booster dynamo as a motor in the direction of engine rotation, thereby applying additional torque to the drive shaft, and, as the vehicle speeds up, the regulator generator automatically causes the booster to change from motoring operation to generating operation to drive the reducer dynamo in the opposite direction and thereby add its speed to the engine speed in driving the load shaft at higher speed, but at reduced torque. My present invention provides increased torque in the initial stage of acceleration by delaying the full shunting effect of the regulator generator on the booster field until after the vehicle has attained a predetermined speed. This is accomplished by connecting the regulator generator in shunt to the booster field through resistance 9c, and providing relay 10b for short-circuiting resistance 9c when the vehicle attains a predetermined speed. Obviously the resistance 9c may be omitted if desired, but I prefer to use the resistance in order to reduce the amount of current which must be controlled by the contacts of relay 10b in connecting and disconnecting the regulator across the booster field. When resistance 9c is employed, the speed-responsive control of the booster is effective from the start of acceleration, but with reduced effectiveness, and short-circuiting of resistance 9c changes the standard of operation of the speed-responsive control to its full effectiveness.

Switch 12a, operated by the accelerator pedal 12, is preferably arranged to be operated by the initial movement of the pedal, although the arrangement may allow for a certain speeding up of the engine before the switch 12a is operated.

*Engine braking*

If the accelerator is released when the car is running at high speed, relay 10c is de-energized and connects the regulator in shunt to reducer field 5b, the main circuit connections being represented in Figure 7 of the drawings. Under this condition, the regulator 9a—9b operates as a series generator for supplying exciting current to field windings 3b and 5b in the directions indicated by the arrows, and both dynamos will be driven from the load shaft in the directions indicated and will tend to act as generators for supplying current to the armature circuit in opposite directions. The direction of flow of current in the armature circuit will be determined by the larger generated voltage, and in Fig. 7 the booster has the larger voltage. The dotted arrow shown in the reducer armature indicates the direction of generated voltage while the solid arrow indicates the direction of current flow. The speeds of the two dynamos and the developed E. M. F. will be sufficient to supply the losses in the circuit. The braking effect upon the vehicle will be proportional to the sum of the power required for the generative action of the two dynamos and the mechanical power necessary for driving the engine from the load shaft, since at this time the load shaft supplies all power for this purpose. As the vehicle slows down, and the voltage of the regulator generator drops below that necessary to maintain relay 10b energized, this relay releases and inserts resistance 9c in the shunt circuit around field winding 3b. This converts the operation of the booster dynamo from a generator to a motor and tends to drive the engine at increased speed, thereby providing engine friction braking at low car speeds.

If a greater braking action is desired, the brake pedal 11 is depressed and the initial movement of this pedal causes operation of switch 11a which energizes relay 10a which in turn disconnects the regulator from the booster field and connects resistance 17 in shunt to the booster field through the upper contacts on the relay. The current flowing through the booster field is thereby greatly reduced, and the resistance of the external circuit connected to the reducer dynamo is greatly reduced, thereby resulting in increased braking action. The degree of braking may be controlled by adjusting the value of resistance 17, and while I prefer to use a resistance to shunt the field of the booster, it is obvious that increased braking may be obtained by simply short-circuiting the field. The braking action afforded by the transmission system may be supplemented by depressing the brake pedal sufficiently to bring the mechanical brakes into action.

Reverse operation

When it is desired to operate the vehicle in reverse direction, the controller is moved to the position R where the field windings 3b and 5b are connected in serial circuit relation with the armatures 3a and 5a but in the opposite direction from the connection for forward operation. It will also be noted that in the reverse position of the controller, the connection of the regulator 9a—9b is open circuited, the regulator not being employed for reverse operation, and contact 6c connects a resistance 16 in shunt to the reducer field 5b. With the brake pedal and the accelerator pedal in released position, the upper terminals of field windings 3b and 5b are connected together through the lower contacts of relay 10a, through the contacts of relay 10b, through contact 6d on controller 6, and through the contacts of relay 10c, thereby short-circuiting the two field windings upon each other and thus preventing either dynamo from building up field. Upon depression of the accelerator pedal, switch 12a energizes relay 10c to open the connection between the upper terminals of the field windings, and, speeding up of the engine causes the booster dynamo to act as a generator and drive the reducer dynamo as a motor in a direction opposite to the direction of engine rotation. As the speed of the reducer dynamo increases above its normal speed for the condition of no speed on the load shaft, the load shaft is driven in the reverse direction at a speed determined by the difference between the speed of the reducer and the speed of the engine. Resistance 16 is provided to secure higher speed of the reducer dynamo for reverse operation and to facilitate pick-up of the booster for reverse operation.

Protection against overheating

In order to prevent operation of the system in the event of overheating of the power dynamos, I provide a thermal switch 13 for controlling the circuit energizing relay 10c, and I arrange the thermal switch at a convenient place within the dynamo structure to respond to overheating of the dynamo. The switch 13 has been shown in Fig. 1 in a position to respond to the temperature rise of the reducer dynamo.

So long as the temperature of the dynamo remains below a predetermined limit, the switch 13 remains closed and the circuit to relay 10c remains intact. Upon an excessive rise in temperature, switch 13 opens, and the full energizing current for relay 10c must then flow through the signal lamp 14 and through the time delay switch 15, which may assume any suitable form but is shown as a thermally operated switch in Figure 1. The lamp 14 is preferably located upon the dashboard of the vehicle and serves as a signal to warn the operator of the abnormal condition. Should the operator continue to operate the vehicle for a time after the lamp 14 gives its signal, the switch 15 will open the circuit to relay 10c, thereby de-energizing the relay and connecting the regulator in shunt to the reducer field winding. This connection will immediately cause the reducer to act as a generator and produce a braking action on the vehicle.

Speed limiting feature

In case the transmission system is employed on vehicles used for public service, such as on buses and the like, it may be desirable to provide means for limiting the maximum speed at which the vehicle may be operated. For this purpose I have provided relay 10d which controls contacts connected in series with the thermal switch 13 and in the path which shunts the signal lamp 14 and the time delay switch 15. The operating circuit for relay 10d is connected directly across the regulator 9a—9b, and, in the event of excessive speeding of the vehicle, the voltage of the regulator becomes sufficient to operate the relay and thereby open the shunt path around the signal lamp 14 and the time delay switch 15. Continued operation at high speed for a predetermined time after lamp 14 becomes energized will result in the opening of switch 15 and the automatic stopping of the vehicle as described above. It will be noted that lamp 14 serves to signal the operator of abnormal operation with respect to both speed of the vehicle and temperature of the power dynamos. Time delay switch 15 is also operative for either condition of abnormal operation.

My control system is not limited to use in an arrangement where a differential gearing is employed to connect the reducer dynamo to the drive shaft and to the load shaft as in Fig. 1, but it may also be employed in the arrangement of Fig. 1a where the reducer is provided with a rotating field as well as a rotating armature and one rotary element is driven by the drive shaft 1 while the other drives the load shaft 2. The booster dynamo has a stationary field and its armature is driven from the drive shaft as in Fig. 1. In both cases the reducer dynamo operates in accordance with the difference in speed of the drive shaft and the driven shaft.

In the appended claims, the term "connected in differential speed relation", when used with reference to the connection of the reducer dynamo to the drive shaft and to the load shaft, is to be interpreted broadly to apply to either the differential gear connection of Fig. 1 or to the arrangement of Fig. 1a.

What I claim is:

1. A transmission system comprising, in combination, a power shaft, a load shaft, a power dynamo driven by the power shaft, a second dynamo connected in differential speed relation to said power shaft and load shaft, a circuit connecting said dynamos for operation of the second dynamo as a generator and the first dynamo as a motor, means responsive to increase in speed of the load shaft for decreasing the motoring action of the first dynamo, and control means rendered operable at a predetermined speed of said load shaft for changing the standard of operation of said responsive means.

2. A transmission system according to claim 1 in which the control means increases the effectiveness of the speed-responsive means at a predetermined speed of the load shaft.

3. A transmission system according to claim 1 wherein the speed-responsive means comprises means for decreasing the excitation of the motoring dynamo with increasing speed of the load shaft, and the control means operates to increase the rate of decrease of excitation.

4. A transmission system comprising, in combination, a power shaft, a load shaft, a power dynamo driven by said power shaft, a second dynamo connected to the load shaft and electrically connected to the first dynamo, means responsive to the speed of the load shaft for controlling the excitation of one of said dynamos, and control means rendered operable at a predetermined speed of said load shaft for changing the standard of operation of said excitation controlling means.

5. A transmission system according to claim 4 wherein the first power dynamo is provided with a series field coil, the excitation controlling means comprises means for shunting current around said coil, and the control means comprises means for decreasing the resistance of said shunting means.

6. A transmission system comprising, in combination, a power shaft, a load shaft, a dynamo driven by the power shaft, a second dynamo connected to the load shaft, a circuit connecting said dynamos including a series field coil on said first dynamo, a conducting path in shunt to said field coil, and control means operable at a predetermined speed of said load shaft for changing the resistance of said shunting path.

7. A transmission system according to claim 6 wherein said control means decreases the resistance of the shunting path at a predetermined speed of the load shaft.

8. A transmission system comprising, in combination, a power shaft, a load shaft, a dynamo driven by the power shaft, a second dynamo connected to the load shaft, a circuit connecting said dynamos including a series field coil on said first dynamo, means for shunting current around said field coil, and means responsive to the speed of the load shaft and rendered operable at a predetermined speed for connecting said shunting means around said field coil.

9. A transmission system according to claim 8, wherein said shunting means comprises a regulating dynamo driven in fixed speed relation with the load shaft.

10. A transmission system comprising, in combination, a power shaft, a load shaft, a power dynamo driven by the power shaft, a second dynamo connected in differential speed relation to said power shaft and load shaft, a circuit connecting said dynamos for operation of the second dynamo as a generator and the first dynamo as a motor, said circuit including a series field coil on the first dynamo, a regulating dynamo driven in fixed speed relation with the load shaft, and means responsive to the speed of the load shaft and rendered operable at a predetermined speed to connect said regulating dynamo in shunt to said field coil.

11. A transmission system according to claim 10 and including a resistance element normally connecting said regulating dynamo in a path in shunt to said field, and said speed responsive means comprises means to short-circuit said resistance at a predetermined speed of said load shaft.

12. A transmission system comprising, in combination, a power shaft, a load shaft, means including a dynamo operating as a motor for transmitting power from the power shaft to the load shaft, and means responsive to a predetermined temperature of said dynamo for converting said dynamo from a motor to a generator and thereby reverse the direction of power flow.

13. A transmission system comprising, in combination, a power shaft, a load shaft, means including a dynamo operating as a motor for transmitting power from the power shaft to the load shaft, and means responsive to the speed of the load shaft and rendered operable at a predetermined speed for converting said dynamo from a motor to a generator and thereby reverse the direction of power flow.

14. A transmission system comprising, in combination, a power shaft, a load shaft, means including a dynamo operating as a motor for transmitting power from the power shaft to the load shaft, means responsive to a predetermined temperature of said dynamo for converting said dynamo from a motor to a generator and thereby reverse the direction of power flow, means responsive to the speed of the load shaft and rendered operable at a predetermined speed for converting said dynamo from a motor to a generator and thereby reverse the direction of power flow, and a signal device rendered operative upon operation of either of said temperature responsive means or said speed responsive means.

15. A transmission system comprising, in combination, a power shaft, a load shaft, means including a dynamo operating as a motor for transmitting power from the power shaft to the load shaft, means including a time-delay relay for converting said dynamo from a motor to a generator and thereby reverse the direction of power flow, and means responsive to a condition of abnormal operation of said system for initiating operation of said time-delay relay.

16. A transmission system comprising, in combination, an engine having a power shaft, a load shaft, a dynamo connected to said power shaft, a dynamo connected to said load shaft, means including a circuit controller having two positions for connecting said dynamos for forward and reverse operation of said load shaft and a third position for disconnecting said dynamos, a battery, a relay for connecting said battery to said first dynamo to drive said engine, and an energizing circuit for said relay including contacts on said controller operative only when said controller is in said third position, and a switch operable independently of said controller for completing said energizing circuit.

17. A transmission system comprising, in combination, an engine having a power shaft and an accelerator, a load shaft, means including a dynamo for transmitting power from the power shaft to the load shaft, a battery, a starting switch normally biased to one position, means including said starting switch when moved to operated position for operating said dynamo from said battery to drive said engine, means responsive to the operation of said accelerator from idling position for controlling said dynamo to transmit power from the power shaft to the load shaft, said controlling means including contacts controlled by said starting switch for rendering said controlling means operative only when said starting switch is in its biased position.

18. In combination, an engine having a power shaft and an accelerator, a load member, a dynamo driven by said power shaft, means controlled by operation of said accelerator from idling position for controlling said dynamo to transmit power from the power shaft to the load, mechanical brakes for said load member and a control element therefor, means controlled by operation of said brake control element from released position for controlling said dynamo to transmit power from the load member to the engine shaft, and means for interlocking said control means to prevent operation of said first control means except when said brake operating member is in released position.

19. In combination, an engine having a power shaft and an accelerator, a load member, a dynamo driven by said power shaft, means controlled by operation of said accelerator from idling position for controlling said dynamo to transmit power from the power shaft to the load, mechanical brakes for said load member and a control element therefor, means controlled by operation of said brake control element from released position for controlling said dynamo to transmit power from the load member to the engine shaft, means for interlocking said control means to prevent operation of said first control means except when said brake operating member is in released position, a battery, a starting switch, means controlled by said starting switch for operating said dynamo from said battery to drive said engine, and means controlled by said starting switch for rendering said first and second control means effective only when said starting switch is in released position.

20. In combination, an engine having a power shaft and an accelerator, a load shaft, a power dynamo driven by the power shaft and having a series field coil, a second power dynamo connected in differential speed relation to said power shaft and said load shaft and having a series field coil, a circuit connecting said dynamos for operation of the second dynamo as a generator and the first dynamo as a motor when said load shaft is stationary, a regulating dynamo driven in fixed speed relation with the load shaft, means for normally connecting said regulating dynamo in shunt to the field coil of the second power dynamo, means controlled by operation of said accelerator from idling position for disconnecting said regulating dynamo from the field coil of the second power dynamo, and means responsive to the speed of the load shaft and rendered operable at a predetermined speed to connect said regulating dynamo in shunt to the field coil of said first power dynamo.

21. In combination, an engine having a power shaft and an accelerator, a load shaft, a power dynamo driven by the power shaft and having a series field coil, a second power dynamo connected in differential speed relation to said power shaft and said load shaft and having a series field coil, a circuit connecting said dynamos for operation of the second dynamo as a generator and the first dynamo as a motor when said load shaft is stationary, a regulating dynamo driven in fixed speed relation with the load shaft, means for normally connecting said regulating dynamo in shunt to the field coil of the second power dynamo, a circuit including a resistance element connecting said regulating dynamo in shunt to the field coil of the first power dynamo, means controlled by operation of said accelerator from idling position for disconnecting said regulating dynamo from the field coil of the second power dynamo, and means responsive to the speed of the load shaft and rendered operable at a predetermined speed to short-circuit said resistance element.

22. In combination, an engine having a power shaft and an accelerator, a load shaft, a power dynamo driven by the power shaft and having a series field coil, a second power dynamo connected in differential speed relation to said power shaft and said load shaft and having a series field coil, a circuit connecting said dynamos for operation of the second dynamo as a generator and the first dynamo as a motor when said load shaft is stationary, a regulating dynamo driven in fixed speed relation with the load shaft, means including normally closed contacts on a relay for connecting said regulating dynamo in shunt to the field coil of the second power dynamo, means including normally open contacts on a second relay for connecting said regulating generator in shunt to the field coil of the first power dynamo, means controlled by said accelerator in idling position for energizing said second relay, means controlled by operation of said accelerator from idling position for energizing the first relay and deenergizing the second relay, and means responsive to the speed of the load shaft and rendered operable at a predetermined speed to energize the second relay.

23. A transmission system according to claim 22 and including a resistance element connected across the normally open contacts of the second relay.

24. In combination, an engine having a power shaft and an accelerator, a load having a shaft, a power dynamo driven by the power shaft and having a series field coil, a second power dynamo connected in differential speed relation to said power shaft and said load shaft and having a series field coil, a circuit connecting said dynamos for operation of the second dynamo as a generator and the first dynamo as a motor when said load shaft is stationary, a regulating dynamo driven in fixed speed relation with the load shaft, means including normally closed contacts on a relay for connecting said regulating dynamo in shunt to the field coil of the second power dynamo, a circuit including normally open contacts on a second relay and normally closed contacts on a third relay for connecting said regulating generator in shunt to the field coil of the first power dynamo, a path for shunting the field coil of the first power dynamo including normally open contacts on said third relay, means controlled by said accelerator in idling position for energizing said second relay, means controlled by operation of said accelerator from idling position for energizing the first relay and de-energizing the second relay, means responsive to the speed of the load shaft and rendered operable at a predetermined speed to energize the second relay, mechanical brakes for said load including an operating element therefor, a switch controlled by said brake operating element, an energizing circuit for said third relay including normally open contacts on said brake switch and adapted to energize said third relay when said brake operating member is moved from released position, said brake switch including normally closed contacts for completing the energizing circuits of said first and second relays when said brake control element is in released position.

25. In combination, an engine having a power shaft and an accelerator, a load shaft, a power dynamo driven by the power shaft and having an armature and series field coil, a second power dynamo connected to said load shaft and having an armature and series field coil, a transmission circuit connecting the elements of said power dynamos in serial circuit relation, a connection for normally short-circuiting the armatures of said power dynamos upon each other, and means responsive to movement of said accelerator from idling position for opening said circuit connection.

26. In combination, an engine having a power shaft and an accelerator, a load shaft, a power dynamo driven by the power shaft and having an armature and a series field coil, a second power dynamo having an armature and a series field coil, differential gearing connecting said second power dynamo in differential speed relation to said power shaft and said load shaft, a transmission circuit connecting the elements of said dynamos in serial circuit relation for operating the second dynamo as a generator and the first dynamo as a motor when said load shaft is stationary, a connection for normally short-circuiting said series field coils upon each other, and means responsive to movement of said accelerator from idling position for opening said short-circuiting connection.

27. In combination, an engine having a power shaft and an accelerator, a load shaft, a power dynamo driven by the power shaft and having an armature and a series field coil, a second power dynamo having an armature and a series field coil, differential gearing connecting said second power dynamo in differential speed relation to said power shaft and said load shaft, a transmission circuit connecting the elements of said dynamos in series circuit relation for operating the second dynamo as a generator and the first dynamo as a motor when said load shaft is stationary, a connection for normally short-circuiting said series field coils upon each other, means responsive to movement of said accelerator from idling position for opening said short-circuiting connection, a regulating dynamo driven in fixed speed relation with the load shaft, and means responsive to the speed of the load shaft and rendered operable at a predetermined speed to connect said regulating dynamo in shunt to the field coil of said first power dynamo.

28. In combination, an engine having a power shaft and an accelerator, a load shaft, a power dynamo driven by the power shaft and having an armature and a series field coil, a second power dynamo having an armature and a series field coil, differential gearing connecting said second power dynamo in differential speed relation to said power shaft and said load shaft, a transmission circuit connecting the elements of said dynamos in serial circuit relation for operating the second dynamo as a generator and the first dynamo as a motor when said load shaft is stationary, a connection for normally short-circuiting said series field coils upon each other, means responsive to movement of said accelerator from idling position for opening said short-circuiting connection, a regulating dynamo driven in fixed speed relation with the load shaft, means for normally connecting said regulating dynamo in shunt to the field coil of the second power dynamo, means controlled by operation of said accelerator from idling position for disconnecting said regulating dynamo from the field coil of the second power dynamo, and means responsive to the speed of the load shaft and rendered operable at a predetermined speed to connect said regulating dynamo in shunt to the field coil of said first power dynamo.

29. In combination, an engine having a power shaft, a load shaft, a power dynamo driven by the power shaft and having a series field coil, a second power dynamo connected to said load shaft and having a series field coil, a battery, and circuit means connecting said battery to operate said first power dynamo as a motor to start said engine, said starting circuit including the series field coil on the second power dynamo for establishing residual magnetism in proper direction in the second power dynamo.

30. In combination, an engine having a power shaft, a load shaft, a power dynamo driven by the power shaft and having a series field coil, a second power dynamo having a series field coil and connected to said load shaft, a regulator generator driven from one of said shafts and having a series field coil, circuit means connecting said battery to operate said first power dynamo as a motor to start said engine, said starting circuit including the series field coil on the second power dynamo for establishing residual magnetism in proper direction in the second power dynamo, and said regulator generator being connected in shunt to one of said series field coils whereby residual magnetism is established in proper direction in the field element of said regulator.

ERNST WEBER.